US011673297B2

(12) United States Patent
Guo et al.

(10) Patent No.: US 11,673,297 B2
(45) Date of Patent: Jun. 13, 2023

(54) MOLDING METHOD FOR PRODUCING A STATOR FOR A SCREW DRILLING TOOL USING ELASTOMER MATERIAL

(71) Applicant: SHANGHAI PUJIA DRILLING TECHNOLOGY CO., LTD., Shanghai (CN)

(72) Inventors: Dingyu Guo, Calgary (CA); Hongrui Zhang, Tianjin (CN); Minghui Zhu, Shanghai (CN); Yiran Liu, Xuzhou (CN); Zhuanrui Liu, Xuzhou (CN); Paul Kwong Shun Cheung, Calgary (CA); Xiaobo Liu, Chengdu (CN)

(73) Assignee: SHANGHAI PUJIA DRILLING TECHNOLOGY CO., LTD., Shanghai (CN)

( * ) Notice: Subject to any disclaimer, the term of this patent is extended or adjusted under 35 U.S.C. 154(b) by 581 days.

(21) Appl. No.: 16/843,908

(22) Filed: Apr. 9, 2020

(65) Prior Publication Data
US 2020/0230845 A1 Jul. 23, 2020

Related U.S. Application Data

(63) Continuation of application No. PCT/CN2019/082764, filed on Apr. 15, 2019.

(30) Foreign Application Priority Data

Oct. 17, 2018 (CN) .......................... 201811211495.7

(51) Int. Cl.
| | |
|---|---|
| *F04C 2/107* | (2006.01) |
| *B29C 33/38* | (2006.01) |
| *B29C 39/10* | (2006.01) |
| *B29C 39/00* | (2006.01) |
| *B29C 39/26* | (2006.01) |
| *B29C 39/36* | (2006.01) |
| *B29B 13/00* | (2006.01) |
| *B29C 33/58* | (2006.01) |
| *B29C 35/02* | (2006.01) |
| *B29K 9/00* | (2006.01) |
| *B29K 105/24* | (2006.01) |
| *B29C 33/64* | (2006.01) |
| *B29C 37/00* | (2006.01) |
| *C08G 18/12* | (2006.01) |
| *C08G 18/32* | (2006.01) |
| *C08G 18/38* | (2006.01) |
| *C08G 18/48* | (2006.01) |
| *C08G 18/76* | (2006.01) |

(Continued)

(52) U.S. Cl.
CPC ............ *B29C 39/10* (2013.01); *B29C 39/006* (2013.01); *B29C 39/26* (2013.01); *B29C 39/36* (2013.01); *F04C 2/1075* (2013.01); *B29B 2013/005* (2013.01); *B29C 33/3842* (2013.01); *B29C 33/58* (2013.01); *B29C 33/64* (2013.01); *B29C 35/02* (2013.01); *B29C 37/006* (2013.01); *B29K 2009/00* (2013.01); *B29K 2105/24* (2013.01); *C08G 18/12* (2013.01); *C08G 18/3243* (2013.01); *C08G 18/3872* (2013.01); *C08G 18/4804* (2013.01); *C08G 18/4833* (2013.01); *C08G 18/4854* (2013.01); *C08G 18/69* (2013.01); *C08G 18/7621* (2013.01); *C09J 175/08* (2013.01); *C09J 175/12* (2013.01)

(58) Field of Classification Search
CPC ..... B29C 67/0022; B29C 33/64; B29C 33/60; F04C 2/1075
See application file for complete search history.

(56) References Cited

U.S. PATENT DOCUMENTS

| | | | | |
|---|---|---|---|---|
| 4,840,675 A * | 6/1989 | Fukui | ................... | C10M 107/50 |
| | | | | 106/38.22 |
| 5,738,463 A * | 4/1998 | Onan | .................. | F16L 58/1054 |
| | | | | 405/157 |
| 6,734,274 B2 * | 5/2004 | Suzuki | ................... | C08G 18/12 |
| | | | | 399/361 |
| 8,497,340 B2 * | 7/2013 | Itami | ...................... | B29C 33/64 |
| | | | | 528/33 |

(Continued)

FOREIGN PATENT DOCUMENTS

| | | |
|---|---|---|
| CN | 101637955 A | 2/2010 |
| CN | 202483870 U | 10/2012 |

(Continued)

OTHER PUBLICATIONS

Machine translation of CN 101637955 A (Year: 2010).*
Licari, James J., and Dale W. Swanson. Adhesives technology for electronic applications: materials, processing, reliability. William Andrew, 2011. Chapter 3, pp. 75-141 (Year: 2011).*
Machine translation of CN 105175683 A (Year: 2015).*

*Primary Examiner* — Benjamin A Schiffman
(74) *Attorney, Agent, or Firm* — Bayramoglu Law Offices LLC

(57) ABSTRACT

A molding method for producing a screw drill stator using an elastomer material includes: S1. sequentially roughening, cleaning and drying an inner surface of the stator tube; mixing an adhesive and a diluent, coating the mixture obtained on the inner surface, and heating it for later use; S2, uniformly coating a mold release agent on a surface of a mandrel mold, and heating or drying it naturally for later use; S3. assembling the processed stator tube and the processed mandrel mold to obtain an assembled mold; S4. performing a vacuum defoaming under negative pressure on a mixture obtained by uniformly mixing a prepolymer of the elastomer material with a defoaming agent; S5. uniformly mixing the defoamed prepolymer of the elastomer material with a curing agent, and pouring the obtained mixture into the assembled mold, sealing and curing the poured assembled mold by hierarchical heating to obtain the stator.

9 Claims, No Drawings

(51) Int. Cl.
*C09J 175/08* (2006.01)
*C09J 175/12* (2006.01)
*C08G 18/69* (2006.01)

(56) References Cited

U.S. PATENT DOCUMENTS

2005/0096411 A1* 5/2005 Molla ................... C09J 175/04
523/210
2011/0070111 A1 3/2011 Slay et al.
2020/0231734 A1* 7/2020 Guo .................... C08G 18/307

FOREIGN PATENT DOCUMENTS

CN 105175683 A * 12/2015
JP 2008006042 A * 1/2008

* cited by examiner

MOLDING METHOD FOR PRODUCING A STATOR FOR A SCREW DRILLING TOOL USING ELASTOMER MATERIAL

CROSS REFERENCE TO THE RELATED APPLICATIONS

This application is a continuation application of International Application No. PCT/CN2019/082764, filed on Apr. 15, 2019, which is based upon and claims priority to Chinese Patent Application No. 201811211495.7, filed on Oct. 17, 2018, the entire contents of which are incorporated hereby by reference.

TECHNICAL FIELD

The present disclosure relates to the field of organic polymer molding processing technology, in particular to a molding method for producing a stator for a screw drilling tool using an elastomer material, which may be applied to the field of drilling technology.

BACKGROUND

With the increasing complexity of drilling and exploration environment and the increasing difficulty of mining, the working conditions for drilling operations are becoming more and more severe. This puts forward new requirements on the elastomer materials for screw drilling tools and the molding preparation processes thereof, and the requirements on the comprehensive performance of the elastomer materials for screw drilling tools becomes higher. At the same time, the tensile strength, tear strength, peel strength, wear resistance, hardness, and temperature resistance of the elastomer materials for screw drilling tools will directly affect the material's lifetime and drilling cost when being used in specific conditions; and the simplification of the molding processes will directly affect the cost of the user. Therefore, the processes for improving the adhesive strength of the interface between materials and metals (especially establishing and maintaining the adhesive strength of the interface under the condition of fluid percolation), simplifying the material processing flow, and optimizing the molding production process have become one of current research hotspots and important development directions in terms of the elastomer materials for drilling tools.

At present, most of the elastomer materials for traditional screw drilling tools are rubber materials. However, the materials have low high-temperature mechanics performance, the tensile strength and tear strength thereof are not good, their adhesion to metal surfaces is insufficient, their molding processing is cumbersome, which usually requires mixing to prepare semi-finished products, thereby obtaining finished materials through vulcanization and secondary vulcanization. The entire production process has a series of problems such as high energy consumption and high pollution, which is not able to meet international requirements on energy conservation and environmental protection. And then, the drilling tool has to be assembled with the drilling equipment so as to perform the drilling operation. Therefore, the process for producing the traditional rubber materials for screw drilling tools is complicated and consume a lot of energy, and the rubber materials have a fast loss rate and a short lifetime. This greatly reduces the economic benefits of drilling development and thus cannot meet requirements and development trends of drilling operations on reducing the cost.

Therefore, the research and development for the molding production process of the elastomer material for screw drilling tools has a great significance in the fields of scientific research and application.

SUMMARY

In view of the defects in the prior art, an object of the present disclosure is to provide a molding method for producing a stator for a screw drilling tool from an elastomer material. A new molding method for producing a stator for a screw drilling tool using an elastomer material is provided for overcoming the disadvantages that the molding process of traditional elastomer materials for screw drilling tools is complicated, high energy consumed, which has a large pollution, weak temperature resistance, low tear strength and low interface peel strength, etc. With this method, the production process is simplified, rapid molding, energy saving and environment protection is realized; and the properties of elastomer materials for screw drilling tools are significantly improved, especially the elastomer materials have high temperature resistance, high tear strength, high hardness, and high peeling strength for the interface between the material and metal.

The present disclosure provides a molding method for producing a stator for a screw drilling tool using an elastomer material, and the provided elastic material not only has the advantages of wear resistance and corrosion resistance that traditional rubber materials have, but also has advantages of high hardness, high temperature resistance and tear strength. The molding process as provided may solve the problem of the adhesion of the interface between the elastomer material for the screw drilling tool and the stator tube, greatly improve the peeling strength for material interface, and extending the lifetime of the stator for the screw drilling tool, which thus meets the stringent requirements on the drilling environment, such as high temperature, small size, large power and long life. At the same time, the molding process as provided has production characteristic of slow energy consumption and low pollution, which greatly meets the requirements on energy saving and environmental protection.

The object of the present disclosure is achieved by the following technical solutions.

The present disclosure provides a molding method for producing a stator for a screw drilling tool using an elastomer material, comprising steps of:

S1, roughening an inner surface of a stator tube of the stator, and then cleaning and drying the inner surface of the stator tube; uniformly mixing an adhesive and a diluent, coating the mixture obtained on the inner surface of the dried stator tube, and heating the inner surface of the stator tube for later use;

S2. uniformly coating a mold release agent on a surface of a mandrel mold, and heating or natural drying the surface of the mandrel mold for later use;

S3. assembling the stator tube processed in step S1 and the mandrel mold processed in step S2 to obtain an assembled mold;

S4. performing a vacuum defoaming under negative pressure on a mixture obtained by uniformly mixing a prepolymer of the elastomer material and a defoaming agent; and S5. uniformly mixing the prepolymer of the elastomer material defoamed in step S4 with a curing agent, and pouring the obtained mixture into the assembled mold obtained in step S3, sealing and curing the poured assembled mold by hierarchical heating; after the curing is completed, drawing the mandrel mold from the assembled mold, so that the stator is obtained.

Preferably, in step S1, the adhesive includes epoxy resin adhesive; and the epoxy resin adhesive may be obtained easily and the cost thereof is low, but it has high product added value, and exhibits good adhesion, toughness and dimensional stability in the application as an adhesive, which thus is one of the adhesive components with better comprehensive performance. In addition, during preparation of the elastomer, the epoxy resin may undergo a post-curing crosslinking reaction with the prepolymer, and the processing conditions of the two crosslinking reactions are well matched with each other, and thus further enhancing the adhesion between the elastomer and the inner wall of the stator tube. If other types of adhesives are used, it is necessary to consider both the adhesive property of the adhesive itself and the compatibility/copolymerization reaction between the adhesive and the prepolymer of the elastomeric material, which may significantly increase the production cost and processing difficulty of the finished product.

Preferably, in step S1, the adhesive comprise epoxy resin, and the diluent comprises at least one of butanediol and glycerin, and a mass ratio of the adhesive to the diluent is (0.72 to 0.91): (0.09 to 0.28). The selection range for the ratio of the adhesive to the diluent is resulted from systematic experimental exploration. Within this range, the system exhibits the best adhesion and processing properties.

Preferably, in step S1, the heating is performed at 80-100° C. for 1-3 hours.

More preferably, in step S1, the heating is performed at 90° C. for 1 hour.

Preferably, in step S2, the mold release agent comprises one or two of the following: silicone resin methyl branched chain silicone oil, methyl silicone oil, and silicone rubber toluene solution and fluororesin coating.

Preferably, in step S2, the surface is an outer surface of the mandrel mold.

Preferably, in step S4, the prepolymer of the elastomer material includes component A and component B, wherein, the component A comprises hydroxyl-terminated liquid rubber, polytetrahydrofuran diol and polyether polyol, and the mass ratio of hydroxyl-terminated liquid rubber, polytetrahydrofuran diol and polyether polyol is (0.2 to 1.0): (0.2 to 1.0): (0.2 to 1.0); and the component B comprises at least one of isocyanate, cyanate, and cyano compound. The function of the hydroxyl-terminated liquid rubber is provide an end capping and provide a cross-linking point, and the function of the polytetrahydrofuran diol and polyether polyol is to provide an end capping. The ratio of the above three components may be adjusted according the above range, thus facilitating controlling the viscosity of the prepolymer, the degree of the crosslinking reactions and the overall properties of the final elastomer. A ratio beyond the above range may make the viscosity of prepolymer too large or too small, or the final performance of the elastomer may not meet the application requirements.

Preferably, the hydroxyl-terminated liquid rubber includes hydroxyl-terminated liquid nitrile rubber (HTBN). Selecting hydroxyl-terminated liquid nitrile rubber can not only increase the fluidity of the elastomer, but also be used for end capping and increase the crosslinking points, thereby improving the crosslinking degree and final strength of the elastomer. If other hydroxyl-terminated liquid rubber is selected instead of the hydroxyl-terminated liquid nitrile rubber, it is difficult to increase the crosslinking degree due to not having active groups for the crosslinking reaction, thereby affecting the overall performance of the elastomer.

Preferably, the isocyanate includes at least one of toluene diisocyanate (TDI) and isophorone diisocyanate (IPDI). If other types of isocyanate are used, such as diphenylmethane diisocyanate, dicyclohexylmethane diisocyanate, etc., the reaction rate will be too fast and the comprehensive performance of the reaction product will not meet the performance requirements of the present disclosure, which is not suitable for the present disclosure.

Preferably, the polyether polyol comprises at least one of propylene glycol polyether, trimethylolpropane polyether, and polyethylene glycol. By adjusting the type and molecular weight of the polyether polyol, the viscosity of the prepolymer and the hardness and resilience of the final elastomer can be effectively controlled.

More preferably, the polyether polyol comprises at least one of the following: propylene glycol polyether with a weight average molecular weight of 800 to 2000, trimethylolpropane polyether with a weight average molecular weight of 400 to 4000, and polyethylene glycol with a weight average molecular weight of 400 to 2000.

Preferably, the mass ratio of the component A to the component B is (0.9: 1.1) to (0.85: 1.25). When the ratio of the component A and the component B is within this range, the capping reaction of the two components is complete and the reaction degree is excellent, and the molecular structure of the final prepolymer is regular and controllable.

More preferably, the mass ratio of the component A to the component B is 1:1. When the mass ratio of the component A to the component B is 1:1, the end-capping reaction of the two components is the most complete, the reaction degree is the best, and the molecular structure of the final prepolymer is the most regular and controllable.

Preferably, a method for preparing the prepolymer of the elastomer material comprises steps of:

A1. placing component B in a reaction vessel, raising the temperature, and performing a dehydration under negative pressure;

A2. adding component A to the component B having been processed in step S1, performing polymerization reaction at a temperature of 50-95° C.; and cooling them to room temperature to obtain the prepolymer. Preferably, in step A1, the reaction conditions of the dehydration under negative pressure includes a reaction temperature of 50-70° C., and a dehydration time of 0.5-2 hours.

Preferably, in step A2, the reaction time for polymerization is 3-8 hours.

Preferably, in step S4, the defoaming agent comprises at least one of polydimethyl siloxane, polyoxypropylene glyceryl ether and silicon ether copolymer; a mass ratio of the prepolymer of the elastomer material to the defoaming agent is (100-167): 1. If the mass ratio of the prepolymer to the defoamer of the elastomer material is less than 100, the defoaming effect is not obvious; higher than 167, it has an impact on the performance of the elastomer.

Preferably, in step S4, the defoaming is performed for 0.5 to 2 h.

Preferably, in step S5, the curing agent is a blend of aromatic diamine and polyol; the aromatic diamine includes at least one of 4,4'-diamino diphenyl sulfone, 4-nitroaniline, p-(bi-O-chloroaniline)-chloroaniline methane; the polyol includes at least one of poly tetrahydrofuran ether glycol, bistrimethylol propane and glycol.

Preferably, in step S5, the mass ratio of the prepolymer of the elastomer material to the curing agent is 1: (0.2 to 0.5). A curing chain extension reaction is performed on the reactive groups for the curing agent and the prepolymer in a certain molar ratio range. When the amount of curing agent being used is within a range of 0.2 to 0.5, the product performance obtained therefrom is the best. When the amount is lower than this range, the curing for the prepolymer system is incomplete, and the comprehensive performance is poor; if the amount is higher than this range, local reactions of the prepolymer may be excessive, and a phase separation occurs in the system, and finally the comprehensive performance is poor.

Preferably, in step S5, the curing by hierarchical heating is performed by curing through heating step by step, including 2 to 6 steps of heating, wherein, a temperature for curing is 60° C.~160° C. and a time for curing at each stage is 1.5~5 h. If the temperature for curing is too low, the curing is incomplete and a certain strength cannot be reached; if the temperature for curing is too high, the material will be decomposed and invalid.

More preferably, in step S5, the temperature of the curing by hierarchical heating is selected from a group consisting of 60° C., 80° C., 100° C., 120° C., 140° C. and 160° C. The curing by hierarchical heating is performed by controlling a curing reaction rate, which firstly adopts a low temperature section for prepolymerization, and adopts a high temperature section to increase the crosslinking degree. If a single temperature is adopted for curing, a low temperature may cause incomplete curing and thus the performance cannot be the best; and a high temperature may cause a violent reaction and an implosion phenomenon may occur, making it impossible to obtain products with stable performance and size.

More preferably, the temperature of the stepwise heat curing is 60° C., 80° C., 100° C., 120° C.

Preferably, the stator tube includes a stator tube for the screw drilling tool, and also includes other tubes with the elastomer material according to the present disclosure adhered on the inner wall thereof, and the other tubes may be metal tubes or non-metal tubes.

The preparation process provided by the present disclosure for the elastomeric material comprises specifically: taking the prepolymer of the elastomeric material and the curing agent system as the material matrixs, and coating an adhesive to the inner surface of the stator tube of the screw drilling tool, performing the in-situ polymerization reaction during the molding process for the prepolymer, so as to enhance the viscosity of the interface between the elastomer material and the stator tube. Through a temperature controlled curing process, a new stator for a screw drilling tool with controlled performance, high temperature resistance, high hardness, and high power per unit length is produced.

The molding production process of the elastomer material provided by the present disclosure has the following characteristics: the elastomer material in the present disclosure is produced by a one-shot molding infusion method and a segmented temperature controlled curing method, so that the finally obtained elastomer material has controllable hardness, high temperature resistance, high tear strength and high peeling strength for interface.

The present disclosure provides a molding method for producing a stator for a screw drilling tool using a novel elastomer material. The elastomer material not only has the advantages of wear resistance and corrosion resistance that traditional rubber materials have, but also has advantages of high hardness, high temperature resistance and tear strength. Meanwhile, the one-shot molding process disclosed in the present disclosure can improve the adhesion of the interface between the elastomer material for the screw drilling tool and the stator, improving the peeling strength of the material interface, and extending the lifetime of the stator for the screw drilling tool, which thus meets the stringent requirements on the drilling environment, such as high temperature, small size, large power and long life. More importantly, the one-shot production process can effectively simplify the molding process, shorten the processing flow and saving energy consumption, which makes it possible to further improve the economic benefits for manufacturers and users without losing environmental quality.

Compared with the prior art, the present disclosure has the following beneficial effects:

By adopting the molding method for producing a stator for a screw drilling tool using the novel elastomer material of the present disclosure, the stator for the screw drilling tool having characteristics of high elastic body hardness, high temperature resistance, and high power per unit length can be easily manufactured. Through adjusting the structure type and ratio of the prepolymer of the elastomer material and curing agent as well as changing the temperature and time for curing, an elastomer material with adjustable and controllable elastic properties such as tensile strength, tear strength, hardness, and permanent deformation rate can be obtained, which is applicable for a variety of operating environments. In addition, as compared with on traditional rubber materials, the elastomer material has a greatly improved hardness, tear strength, temperature resistance and peel strength for interface, so that the stator for the screw drilling tool produced by this material through the process could be better adapted to stringent drilling environment requirements, such as, high temperature, small space, high power, etc., and industrialization would be easily achieved.

DETAILED DESCRIPTION

The present disclosure is described in details below with reference to specific embodiments. The following embodiments are described herein for facilitating those skilled in the art to further understand the present disclosure, but do not intend to limit the present disclosure in any form. It should be noted that for those of ordinary skill in the art, several changes and improvements may be made without departing from the concept of the present disclosure. The changes and improvement all belong to the protection scope of the present disclosure.

Embodiment 1

This embodiment provides a molding method for producing a stator for a screw drilling tool using an elastomer material, including the following steps:

1. Preparing virgin pulp for a prepolymer of the elastic material, which includes:

Step (1), placing 20 kg of toluene diisocyanate (TDI) in a reaction kettle, raising the temperature to 50° C., and then performing a dehydration under negative pressure for 1 h;

Step (2), weighing out hydroxyl-terminated liquid nitrile rubber (10 kg), polytetrahydrofuran diol (6 kg), and polyethylene glycol (4 kg) having polyether polyol with a molecular weight of 2000, and gradually dropping them in order into the reaction kettle in step (1) for continuously reacting at 50° C. for 8 hours;

Step (3), after the reaction in step (2) is completed, naturally cooling the reaction kettle to room temperature to obtain the virgin pulp for the prepolymer of the elastomer material;

2. Molding process by using the virgin pulp for the prepolymer of the elastomer material, including the following steps:

Step (1), roughening an inner surface of a stator tube of the drilling tool, and cleaning and drying it;

Step (2), mixing 500 g of epoxy resin adhesive with 100 g of butanediol, uniformly coating the mixture on the inner surface of the stator tube of the drilling tool obtained in step (1), heating the coated stator tube at 90° C. for 1 h for later use; then uniformly coating silicone resin methyl branched chain silicone oil on a surface of the mandrel mold, and natural drying it for later use; and assembling the processed stator tube with the mandrel to obtain an assembled mold for later use;

Step (3), mixing 25 kg of virgin pulp for the prepolymer of elastomer material with 250 g of defoaming agent uniformly, performing a vacuum defoaming under negative pressure on the mixture at 50° C. for 1 h, and then cooling it to room temperature naturally;

Step (4), mixing 25 kg of the defoamed virgin pulp for the prepolymer of the elastomer material obtained in step (3) with 10 kg of 4,4'-diamino diphenyl sulfone/glycol system curing agent, and then pouring the mixture until into an assembled mold, and sealing it;

Step (5), placing the basis material obtained in step (4) and the mold into a hierarchical heating device for curing; the temperatures for processing are 60° C., 80° C., 100° C. and 120° C. respectively, and the time for processing is 2 h;

Step (6), after the curing is completed and is naturally cooled to room temperature, drawing the mandrel mold from the assembled mold, so that the product being produced is obtained.

In this embodiment, the colloidal surface of the product obtained after curing in step (6) is flat and free of defects such as bubbles. The test results are as follows: The tested tensile strength is 18.2 MPa, the elongation at break is 638%, the permanent deformation rate (recovery after 300% stretching) is 5.7%, the tear strength is 76 kN/m, and the Shore hardness is 84A. All data obtained are higher than those as required by the standard of elastomer materials for screw drilling tools (HG/T 4382-2012). In this embodiment, the interface between the elastomer material and the stator tube has good adhesion, and the hardness may reach to 80A-90A while maintaining excellent adhesion, the elastomer material has high peel strength, and the stator for the screw drilling tool has a long lifetime.

Embodiment 2

This embodiment provides a molding method for producing a stator for a screw drilling tool using an elastomer material, including the following steps:

1. Preparing virgin pulp for a prepolymer of the elastic material, which includes:

Step (1), placing 20 kg of bisphenol M cyanate in a reaction kettle, raising the temperature to 50° C., and then performing a dehydration under negative pressure for 1 h;

Step (2), weighing out hydroxyl-terminated liquid nitrile rubber (10 kg), polytetrahydrofuran diol (6 kg), and trimethylolpropane polyether (4 kg) with a molecular weight of 4000, and gradually dropping them in order into the reaction kettle in step (1) for continuously reacting at 50° C. for 8 hours;

Step (3), after the reaction in step (2) is completed, naturally cooling the reaction kettle to room temperature to obtain the virgin pulp for the prepolymer of the elastomer material.

2. Molding process by using the virgin pulp for the prepolymer of the elastomer material, including the following steps:

Step (1), roughening a surface of a stator tube, and cleaning and drying it;

Step (2), mixing 500 g of epoxy resin adhesive with 70 g of glycerol, uniformly coating the mixture on the inner surface of the stator tube obtained in step (1), heating the coated stator tube at 90° C. for 1 h for later use; then uniformly coating methyl silicone oil on a surface of the mandrel mold, and natural drying it for later use; and assembling the processed stator tube with the mandrel to obtain an assembled mold for later use;

Step (3), mixing 25 kg of virgin pulp for the prepolymer of elastomer material with 200 g of defoaming agent uniformly, performing a vacuum defoaming under negative pressure on the mixture at 50° C. for 1 h, and then cooling it to room temperature naturally;

Step (4), mixing 25 kg of the defoamed virgin pulp for the prepolymer of the elastomer material obtained in step (3) with 10.63 kg of 4-nitroaniline/bistrimethylol propane system curing agent, and then pouring the mixture until into an assembled mold, and sealing it;

Step (5), placing the basis material obtained in step (4) and the mold into a hierarchical heating device for curing; the temperatures for processing are 60° C., 80° C., 100° C. and 120° C., and the time for processing is 3 h;

Step (6), after the curing is completed and is naturally cooled to room temperature, drawing the mandrel mold from the assembled mold, so that the product being produced is obtained.

In this embodiment, the colloidal surface of the product obtained after curing in step (6) is flat and free of defects such as bubbles. The test results are as follows: The tested tensile strength is 20.1 MPa, the elongation at break is 430%, the permanent deformation rate (recovery after 300% stretching) is 3.6%, the tear strength is 52 kN/m, and the Shore hardness is 82A. All data obtained are higher than those as required the standard of elastomer materials for screw drilling tools (HG/T 4382-2012). In this embodiment, the interface between the elastomer material and the stator tube has good adhesion, and the hardness may reach to 80A-90A while maintaining excellent adhesion, the elastomer material has high peel strength, and the stator for the screw drilling tool has a long lifetime.

Embodiment 3

This embodiment provides a molding method for producing a stator for a screw drilling tool using an elastomer material, including the following steps:

1. Preparing virgin pulp for a prepolymer of the elastic material, which includes:

Step (1), placing 20 kg of nitrile-terminated polyether nitrile in a reaction kettle, raising the temperature to 50° C., and then performing a dehydration under negative pressure for 1 h;

Step (2), weighing out hydroxyl-terminated liquid nitrile rubber (6 kg), polytetrahydrofuran diol (10 kg), and propylene glycol polyether (4 kg) with a molecular weight of 2000, and gradually dropping them in order into the reaction kettle in step (1) for continuously reacting at 60° C. for 8 hours;

Step (3), after the reaction in step (2) is completed, naturally cooling the reaction kettle to room temperature to obtain the virgin pulp for the prepolymer of the elastomer material;

2. Molding process by using the virgin pulp for the prepolymer of polyurethane, including the following steps:

Step (1), roughening a surface of a stator tube, and cleaning and drying it;

Step (2), mixing 500 g of epoxy resin adhesive and 90 g of butanediol with diluent of the blend system in a mass ratio of 1:1, uniformly coating the mixture on the inner surface of the stator tube obtained in step (1), heating the coated stator tube at 90° C. for 1 h for later use; then uniformly coating silicone rubber toluene solution on a surface of the mandrel mold, and natural drying it for later use; and assembling the processed stator tube with the mandrel to obtain an assembled mold for later use;

Step (3), mixing 25 kg of the virgin pulp for the prepolymer of polyurethane with 150 g of defoaming agent uniformly, performing a vacuum defoaming under negative pressure on the mixture at 50° C. for 1 h, and then cooling it to room temperature naturally;

Step (4), mixing 25 kg of the defoamed virgin pulp for the prepolymer of polyurethane obtained in step (3) with 10.63 kg of p-(bi-O-chloroaniline)-chloroaniline methane/bistrimethylol propane system curing agent, and then pouring the mixture until into an assembled mold, and sealing it;

Step (5), placing the basis material obtained in step (4) and the mold into a hierarchical heating device for curing; the temperatures for processing are 60° C., 80° C., 100° C. and 120° C., and the time for processing is 4 h;

Step (6), after the curing is completed and is naturally cooled to room temperature, drawing the mandrel mold from the assembled mold, so that the product being produced is obtained.

In this embodiment, the colloidal surface of the product obtained after curing in step (6) is flat and free of defects such as bubbles. The test results are as follows: The tested tensile strength is 20.1 MPa, the elongation at break is 408%, the permanent deformation rate (recovery after 300% stretching) is 3.96%, the tear strength is 72 kN/m, and the Shore hardness is 88A. All data obtained are higher than those as required by the standard of elastomer materials for screw drilling tools (HG/T 4382-2012). In this embodiment, the interface between the elastomer material and the stator tube has good adhesion, and the hardness may reach to 80A-90A while maintaining excellent adhesion, the elastomer material has high peel strength, and the stator for the screw drilling tool has a long lifetime.

Embodiment 4

This embodiment provides a molding method for producing a stator for a screw drilling tool using an elastomer material, including the following steps:

1. Preparing virgin pulp for a prepolymer of the elastic material, which includes:

Step (1), placing 20 kg of bisphenol M cyanate in a reaction kettle, raising the temperature to 50° C., and then performing dehydration under negative pressure for 1 h;

Step (2), weighing out hydroxyl-terminated liquid nitrile rubber (5 kg), polytetrahydrofuran diol (8 kg), and trimethylolpropane polyether (7 kg) with a molecular weight of 1000, and gradually dropping them in order into the reaction kettle in step (1) for continuously reacting at 60° C. for 5 hours;

Step (3), after the reaction in step (2) is completed, naturally cooling the reaction kettle to room temperature to obtain the virgin pulp for the prepolymer of the elastomer material;

2. Molding process by using the virgin pulp for the prepolymer of polyurethane, including the following steps:

Step (1), roughening a surface of a stator tube, and cleaning and drying it;

Step (2), mixing 500 g of epoxy resin adhesive and 80 g of butanediol, uniformly coating the mixture on the inner surface of the stator tube obtained in step (1), heating the coated stator tube at 90° C. for 1 h for later use; then uniformly coating methyl silicone oil on a surface of the mandrel mold, and natural drying it for later use; and assembling the processed stator tube with the mandrel to obtain an assembled mold for later use;

Step (3), mixing 25 kg of the virgin pulp for the prepolymer of polyurethane with 180 g of defoaming agent uniformly, performing a vacuum defoaming under negative pressure on the mixture at 50° C. for 1 h, and then cooling it to room temperature naturally;

Step (4), mixing 25 kg of the defoamed virgin pulp for the prepolymer of polyurethane obtained in step (3) with 11.25 kg of 4-nitroaniline/Di-trimethylolpropane system curing agent, and then pouring the mixture until into an assembled mold, and sealing it;

Step (5), placing the basis material obtained in step (4) and the mold into a hierarchical heating device for curing; the temperatures for processing are 60° C., 80° C., 100° C. and 120° C., and the time for processing is 5 h;

Step (6), after the curing is completed and is naturally cooled to room temperature, drawing the mandrel mold from the assembled mold, so that the product being produced is obtained.

In this embodiment, the colloidal surface of the product obtained after curing in step (6) is flat and free of defects such as bubbles. The test results are as follows: The tested tensile strength is 24.7 MPa, the elongation at break is 505%, the permanent deformation rate (recovery after 300% stretching) is 3.6%, the tear strength is 90 kN/m, and the Shore hardness is 87A. All data obtained are higher than those as required by the standard of elastomer materials for screw drilling tools (HG/T 4382-2012). In this embodiment, the interface between the elastomer material and the stator tube has good adhesion, and the hardness may reach to 80A-90A while maintaining excellent adhesion, the elastomer material has high peel strength, and the stator for the screw drilling tool has a long lifetime.

Embodiment 5

This embodiment provides a molding method for producing a stator for a screw drilling tool using an elastomer material. The specific steps are basically the same as those in Embodiment 1, except that the temperatures for curing in step (5) of this embodiment are 60° C. and 160° C., the time for curing is 3 h and 5 h, respectively.

The colloidal surface of the product prepared in this embodiment is flat and free of defects such as bubbles. The tensile strength, elongation at break, permanent deformation rate (recovery after 300% stretching), tear strength, and Shore hardness are higher than those as required by the standard of elastomer materials for screw drilling tools (HG/T 4382-2012), but slightly worse than the results of Example 1.

Embodiment 6

This embodiment provides a molding method for producing a stator for a screw drilling tool using an elastomer material. The specific steps are basically the same as those in Embodiment 1, except that the temperatures for curing in step (5) of this embodiment are 60° C., 80° C., 100° C., 120° C., 140° C. and 160° C., the time for curing is 1.5 h in all stage.

The colloidal surface of the product prepared in this embodiment is flat and free of defects such as bubbles. The tensile strength, elongation at break, permanent deformation rate (recovery after 300% stretching), tear strength, and Shore hardness are higher than those as required by the standard of elastomer materials for screw drilling tools (HG/T 4382-2012), but slightly worse than the results of Example 1.

Comparative Example 1

This comparative example provides a molding method for producing a stator for a screw drilling tool using a conventional elastomer material. The specific steps are basically the same as those in Embodiment 1, except that in this comparative example, a prepolymer for conventional PTMG polyurethane is used.

The surface of the product obtained after curing in this comparative example is flat and free of defects such as bubbles. The test results are as follows: tensile strength is 12.6 MPa, the elongation at break is 798%, the permanent deformation rate (recovery after 300% stretching) is 5.8%, and the tearing strength is 48 kN/m and the Shore hardness is 82 A. The tensile strength is lower than that as required by the standard of elastomer materials for screw drilling tools (HG/T 4382-2012). Besides, ordinary prepolymers for polyurethane have poor water resistance, especially when the temperature exceeds 70° C., thus it cannot be applied to the operation condition and environment.

Comparative Example 2

This comparative example provides a molding method for producing a stator for a screw drilling tool using a conventional elastomer material. The specific steps are basically the same as those in Embodiment 1, except that in this comparative example, in step (5), the basis material obtained in step (4) is placed in the heating device together with the mold for curing treatment; the temperature for curing is 120° C., and the time for curing is 8 h.

The surface of the product obtained after curing in this comparative example is relatively flat but with obvious internal bubbles and obvious phase separation. The test results are as follows: the tensile strength is 14.8 MPa, the elongation at break is 459%, and the permanent deformation rate (recovery after 300% stretching) is 3.8%, the tear strength is 52 k/m, and the Shore hardness is about 85A. The tensile strength is lower than that as required by the standard of elastomer materials for screw drilling tools (HG/T 4382-2012).

Comparative Example 3

This comparative example provides a molding method for producing a stator for a screw drilling tool using a conventional elastomer material. The specific steps are basically the same as those in Embodiment 1, except that in this comparative example, in step (5), the basis material obtained in step (4) is placed in the heating device together with the mold for curing treatment; the temperatures for curing are 50° C., 70° C., 90° C. and 110° C. respectively, and the time for curing is 2 h.

The surface of the product obtained after curing in this comparative example is relatively flat and free of defects such as bubbles. The test results are as follows: the tensile strength is 12.6 MPa, the elongation at break is 627%, and the permanent deformation rate (recovery after 300% stretching) is 5.8%, the tear strength is 43 k/m, and the Shore hardness is about 78A. The tensile strength and tear strength are lower than those as required by the standard of elastomer materials for screw drilling tools (HG/T 4382-2012).

Comparative Example 4

This comparative example provides a molding method for producing a stator for a screw drilling tool using a conventional elastomer material. The specific steps are basically the same as those in Embodiment 1, except that in this comparative example, in step (4), 25 kg of the defoamed virgin pulp for the prepolymer of polyurethane is mixed with 9 kg of 4,4'-diamino diphenyl sulfone/glycol system curing agent.

The surface of the product obtained after curing in this comparative example is relatively flat but with few bubbles and slight phase separation. The test results are as follows: the tensile strength is 10.2 MPa, the elongation at break is 690%, and the permanent deformation rate (recovery after 300% stretching) is 5.1%, the tear strength is 58 k/m, and the Shore hardness is about 82A. The tensile strength is lower than those as required by the standard of elastomer materials for screw drilling tools (HG/T 4382-2012).

Comparative Example 5

This comparative example provides a molding method for producing a stator for a screw drilling tool using a conventional elastomer material. The specific steps are basically the same as those in Embodiment 1, except that in this comparative example, in step (4), is instead of 4,4'-diamino diphenyl sulfone/glycol system curing agent, phthalic anhydride system curing agent is used.

The surface of the product obtained after curing in this comparative example is relatively flat but with tittle small air bubbles remained within the system. The test results are as follows: the tensile strength is 11.8 MPa, the elongation at break is 498%, the permanent deformation rate (recovery after 300% stretching) is 5.3%, the tear strength is 51 kN/m, and the Shore hardness is about 72A. The tensile strength is lower than those as required by the standard of elastomer materials for screw drilling tools (HG/T 4382-2012).

Among the mechanical properties of the products obtained from the five comparative examples, the tensile strength and the tear strength were lower than those of the products in the embodiments of the present disclosure, and the tensile strength does not reach to that as required by the standard of elastomer materials for screw drilling tools (HG/T 4382-2012); meanwhile, the conventional elastomers used in comparative example 1 does not meet the requirements on drilling operation conditions in terms of temperature resistance and warm water resistance.

The present disclosure provides a method for molding a stator for a screw drilling tool using a novel elastomer material, which mainly includes processes such as surface and interface treatment, assembly, injection of new materials, and curing molding of a steel pipe (stator tube) for a screw drilling tool and a mandrel. The raw materials required for the production process include virgin pulp, curing agent, defoaming agent, mold release agent, adhesive, and diluent. By introducing the new elastomer material, the production process and the production flow have been effectively simplified, and a one-shot production process is achieved. Firstly, the adhesive is mixed with the diluent in a ration of (0.72-0.91): (0.09-0.28), and the inner surface of the stator tube is uniformly coated by the mixture and then is heated for preliminary curing; the mold release agent is uniformly coated on the outer surface of the mandrel and is then dried by airing or by oven; then the stator tube is assembled with the mandrel. Finally, through mixing the virgin pulp of prepolymer with the curing agent by mixing the ratio thereof, and injecting the mixture into an assembly of the stator tube and the mandrel under high pressure and curing it by heating according to a program, a one-shot production process is achieved and a stator for the screw drilling tool which meets design requirements on performance (such as hardness, tear strength, tensile strength, elongation at break, permanent deformation rate, and temperature resistance, oil resistance, and warm water resistance) is obtained. The one-shot production process for the material belongs to the field of organic polymer processing technology, and the material can be specifically used as an elastomer material in the field of drilling technology.

The specific embodiments of the present disclosure have been described above. It should be understood that the present disclosure is not limited to the above specific embodiments, and those skilled in the art can make various changes or modifications within the scope of the claims, which does not affect the essence of the present invention. In the case of no conflict, the embodiments of the present application and the features in the embodiments can be arbitrarily combined with each other.

The invention claimed is:

1. A molding method for producing a stator for a screw drilling tool using an elastomer material, comprising steps of:
   S1, roughening an inner surface of a stator tube of the stator, and then cleaning and drying the inner surface of the stator tube; uniformly mixing an adhesive and a diluent, coating the mixture obtained on the inner surface of the dried stator tube, and heating the inner surface of the stator tube for later use; wherein the adhesive comprises epoxy resin adhesive, and the diluent comprises at least one of butanediol and glycerin, and a mass ratio of the adhesive to the diluent is (0.72 to 0.91): (0.09 to 0.28);
   S2, uniformly coating a mold release agent on a surface of a mandrel mold, and heating or natural drying the surface of the mandrel mold for later use;
   S3, assembling the stator tube processed in step S1 and the mandrel mold processed in step S2 to obtain an assembled mold;
   S4, performing a vacuum defoaming under negative pressure on a mixture obtained by uniformly mixing a prepolymer of the elastomer material with a defoaming agent; and
   S5, uniformly mixing the prepolymer of the elastomer material defoamed in step S4 with a curing agent, and pouring the obtained mixture into the assembled mold obtained in step S3, sealing and curing the poured assembled mold by hierarchical heating; after the curing is completed, drawing the mandrel mold from the assembled mold, so that the stator is obtained.

2. The molding method for producing a stator for a screw drilling tool using an elastomer material according to claim 1, wherein in step S1, the heating is performed at 80-100° C. for 1-3 hours.

3. The molding method for producing a stator for a screw drilling tool using an elastomer material according to claim 1, wherein in step S2, the mold release agent comprises one or two of the following: silicone resin methyl branched chain silicone oil, methyl silicone oil, silicone rubber toluene solution and fluororesin coatings.

4. The molding method for producing a stator for a screw drilling tool using an elastomer material according to claim 1, wherein in step S4, the defoaming agent comprises at least one of polydimethylsiloxane, polyoxypropylene glycerol ether and silicon ether copolymer; a mass ratio of the prepolymer of the elastomer material to the defoaming agent is (100-167): 1; and the defoaming is performed for 0.5 to 2 h.

5. The molding method for producing a stator for a screw drilling tool using an elastomer material according to claim 1, wherein in step S5, the curing agent is a blend of aromatic diamine and polyol; a mass ratio of the prepolymer of the elastomer material to the curing agent is 1: (0.2~0.5).

6. A molding method for producing a stator for a screw drilling tool using an elastomer material, comprising steps of:
   S1, roughening an inner surface of a stator tube of the stator, and then cleaning and drying the inner surface of the stator tube; uniformly mixing an adhesive and a diluent, coating the mixture obtained on the inner surface of the dried stator tube, and heating the inner surface of the stator tube for later use
   S2, uniformly coating a mold release agent on a surface of a mandrel mold, and heating or natural drying the surface of the mandrel mold for later use;
   S3, assembling the stator tube processed in step S1 and the mandrel mold processed in step S2 to obtain an assembled mold;
   S4, performing a vacuum defoaming under negative pressure on a mixture obtained by uniformly mixing a prepolymer of the elastomer material with a defoaming agent; and
   S5, uniformly mixing the prepolymer of the elastomer material defoamed in step S4 with a curing agent, and pouring the obtained mixture into the assembled mold obtained in step S3, sealing and curing the poured assembled mold by hierarchical heating; after the curing is completed, drawing the mandrel mold from the assembled mold, so that the stator is obtained wherein in step S4, the prepolymer of the elastomer material includes component A and component B, wherein, the component A comprises hydroxyl-terminated liquid rubber, polytetrahydrofuran diol and polyether polyol, and a mass ratio of hydroxyl-terminated liquid rubber, polytetrahydrofuran diol and polyether polyol is (0.2 to 1.0): (0.2 to 1.0): (0.2 to 1.0); and the component B comprises at least one of isocyanate, cyanate, and cyano compound.

7. The molding method for producing a stator for a screw drilling tool using an elastomer material according to claim 6, wherein the hydroxyl-terminated liquid rubber comprises a hydroxyl-terminated liquid nitrile rubber; and the isocyanate comprises at least one of toluene diisocyanate and isophorone diisocyanate; the polyether polyol comprises at least one of propylene glycol polyether, trimethylolpropane polyether and polyethylene glycol.

8. The molding method for producing a stator for a screw drilling tool using an elastomer material according to claim 6, wherein a mass ratio of the component A to the component B is (0.9: 1.1) to (0.85: 1.25).

9. A molding method for producing a stator for a screw drilling tool using an elastomer material comprising steps of:
- S1, roughening an inner surface of a stator tube of the stator, and then cleaning and drying the inner surface of the stator tube; uniformly mixing an adhesive and a diluent, coating the mixture obtained on the inner surface of the dried stator tube, and heating the inner surface of the stator tube for later use;
- S2, uniformly coating a mold release agent on a surface of a mandrel mold, and heating or natural drying the surface of the mandrel mold for later use;
- S3, assembling the stator tube processed in step S1 and the mandrel mold processed in step S2 to obtain an assembled mold;
- S4, performing a vacuum defoaming under negative pressure on a mixture obtained by uniformly mixing a prepolymer of the elastomer material with a defoaming agent; and
- S5, uniformly mixing the prepolymer of the elastomer material defoamed in step S4 with a curing agent, and pouring the obtained mixture into the assembled mold obtained in step S3, sealing and curing the poured assembled mold by hierarchical heating; after the curing is completed, drawing the mandrel mold from the assembled mold, so that the stator is obtained; wherein the curing by hierarchical heating is performed by curing through heating step by step, including 2 to 6 steps of heating, wherein, a temperature for curing is 60° C.~160° C. and a time for curing at each stage is 1.5~5 h.

* * * * *